(12) United States Patent
Yang

(10) Patent No.: US 9,928,122 B2
(45) Date of Patent: Mar. 27, 2018

(54) MANAGING APPLICATIONS FOR POWER CONSERVATION

(71) Applicant: Alibaba Group Holding Limited, George Town (KY)

(72) Inventor: Wujun Yang, Beijing (CN)

(73) Assignee: Alibaba Group Holding Limited (KY)

(*) Notice: Subject to any disclaimer, the term of this patent is extended or adjusted under 35 U.S.C. 154(b) by 0 days.

(21) Appl. No.: 14/829,984

(22) Filed: Aug. 19, 2015

(65) Prior Publication Data

US 2016/0054789 A1 Feb. 25, 2016

(30) Foreign Application Priority Data

Aug. 21, 2014 (CN) .......................... 2014 1 0415905

(51) Int. Cl.
*G06F 1/32* (2006.01)
*G06F 9/54* (2006.01)

(52) U.S. Cl.
CPC .............. *G06F 9/542* (2013.01); *G06F 1/329* (2013.01); *Y02B 60/144* (2013.01); *Y02B 60/32* (2013.01)

(58) Field of Classification Search
CPC .................................. G06F 1/329; G06F 9/542
See application file for complete search history.

(56) References Cited

U.S. PATENT DOCUMENTS

| 8,020,025 | B2 | 9/2011 | Hyatt |
| 8,023,361 | B2 | 9/2011 | Kokuryu |
| 8,453,002 | B2 | 5/2013 | Yoshida |
| 8,812,761 | B2 | 8/2014 | Heller et al. |
| 2010/0153765 | A1 | 6/2010 | Stemen et al. |
| 2013/0055271 | A1 | 2/2013 | Yoo et al. |
| 2014/0112111 | A1 | 4/2014 | Zhu et al. |
| 2014/0195839 | A1 | 7/2014 | Chueh et al. |
| 2014/0344764 | A1 | 11/2014 | Brewer |
| 2015/0235542 | A1* | 8/2015 | Su .................... H04W 52/0229 340/506 |

FOREIGN PATENT DOCUMENTS

EP 0838757 4/1998

* cited by examiner

*Primary Examiner* — Stefan Stoynov
(74) *Attorney, Agent, or Firm* — Van Pelt, Yi & James LLP

(57) ABSTRACT

Embodiments of the present application relate to a method, apparatus, and system for waking up an app. The method includes adding an application (app) to a wake-up alarm group comprising a plurality of apps, adjusting a plurality of alarm wake-up times corresponding to the plurality of apps, wherein the plurality of alarm wake-up times corresponding to the plurality of apps are adjusted to be consistent, and waking up the plurality of apps belonging to the wake-up alarm group according to the adjusted alarm wake-up times corresponding to the plurality of apps belonging to the wake-up alarm group.

30 Claims, 7 Drawing Sheets

MANAGING APPLICATIONS FOR POWER CONSERVATION

CROSS REFERENCE TO OTHER APPLICATIONS

This application claims priority to People's Republic of China Patent Application No. 201410415905.5 entitled AN APP WAKE-UP METHOD AND DEVICE, filed Aug. 21, 2014 which is incorporated herein by reference for all purposes.

FIELD OF THE INVENTION

The present application relates to power management of devices. In particular, the present application relates to management of how applications are woken up when the device is in a standby mode.

BACKGROUND OF THE INVENTION

As third-generation (3G) mobile telecommunication technology networks spread, an increasing number of smart terminals (e.g., mobile phones with Internet access and relatively more advanced processing capabilities) are being used to access the internet. Consequently, an increasing number of new applications (apps) are being developed according to user demands relating to Internet access and using the advanced functionality of smart terminals. Many functions that users previously relied on computers (e.g., PCs) to perform are now being performed completed by smart terminals. Although smart terminals are bringing more and more functionality to users, smart terminals are also suffering a defect, namely increasingly high power consumption.

When a terminal is in a standby mode, the terminal consumes less power than when the terminal is in an operating mode. Therefore, when a terminal has less surplus energy, the user generally will set the terminal to standby mode so as to conserve power. However, many apps run on the terminal not only while the user is operating the terminal, but also when the terminal is set to standby mode. Such apps periodically wake up the operating system in the background and communicate with networks. Thus, relatively large amounts of power are being consumed unbeknownst to the user.

A terminal tends to consume a relatively large amount of power when the terminal is set to standby because periodic wake-up times associated with various apps running on the terminal are not consistent. Accordingly, one app can be woken up when another app has just entered into standby state. As a result, the operating system is constantly being woken up by the various apps and does not stay in standby mode.

Conventional art addresses the problems associated with inconsistent wake-up times of various apps running on a terminal by adopting a "unified heartbeat" approach. According to the "unified heartbeat" approach, the wake-up times for all apps within a system are unified to the same wake-up time. Thus, all the apps in a system may be woken up at the same time. However, because each app has a different wake-up cycle need, such an approach will adversely affect the performance of some apps. For example, WeChat™ is an instant messaging software. If the wake-up cycle corresponding to WeChat™ is configured to be consistent with other software which does not involve instant requirements (e.g., an online translation dictionary), the unified wakeup times would diminish WeChat™'s instant messaging performance, especially when the wake-up cycle is set to have a long interval such as one hour.

Letting each app set its own periodic wake-up time means that mobile phone power consumption is relatively high during standby mode. However, the unified wake-up time approach diminishes the performance of some apps.

BRIEF DESCRIPTION OF THE DRAWINGS

Various embodiments of the invention are disclosed in the following detailed description and the accompanying drawings.

DETAILED DESCRIPTION

Figure 1:
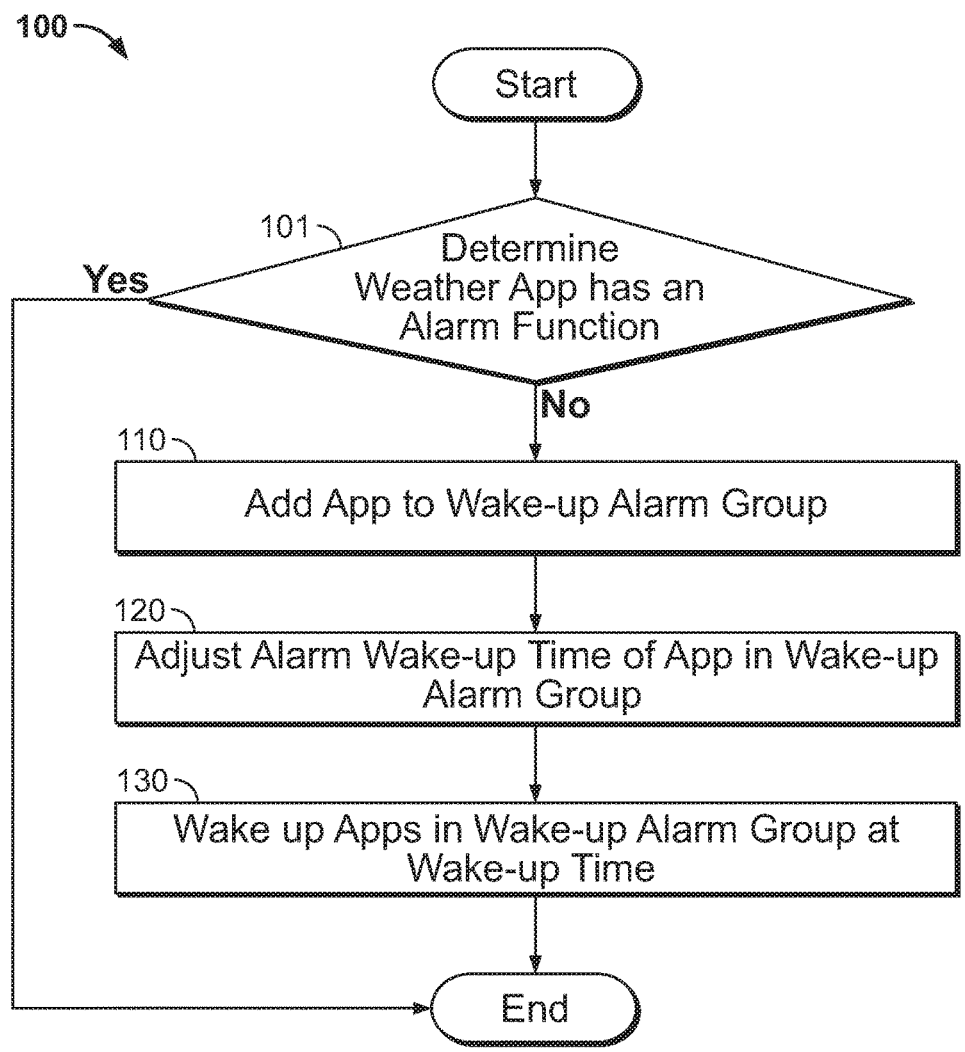
FIG. 1 is a flow chart of a method for waking up an app according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments relate to a method, system, and apparatus for setting a power-saving level associated with an app. According to various embodiments, a power-saving level is set for each app. For example, a power-saving level is set for a corresponding app installed on a terminal such as a mobile terminal, a PC, a tablet, a wearable terminal such as a smart watch, the like, or any combination thereof. Various wake-up time intervals can be set to correspond to the various power-saving levels. In some embodiments, all apps are associated with corresponding power-saving levels. In some embodiments, a subset of all apps are associated with corresponding power-saving levels. For example, a power-saving level associated with a particular app can be set when the power-saving level is needed or desirable for the particular app. In the event that a power-saving level associated with an app is set, the app is added to the appropriate wake-up alarm group (e.g., the wake-up alarm group corresponding to the power-saving level set to be associated with an identifier or a reference of the app). In some embodiments, the alarm wake-up time of each app in a particular wake-up alarm group is adjusted to make the alarm wake-up times of each app consistent. In the event that the apps in a wake-up alarm clock have a consistent alarm wake-up time, the apps in the wake-up alarm group are woken up at the corresponding wake-up time. In some embodiments, alarm wake-up times for multiple apps are configurable (e.g., can be adjusted according to user settings or user preferences) to make the alarm wake-up times consistent (e.g., making the apps correspond to a particular wake-up alarm clock). For example, multiple apps can use the same wake-up time, thus reducing the wake-up frequency for the operating system, increasing operating system sleep time, and conserving terminal power. In some embodiments, a power-saving level is set for each app. The power-saving level set for each app can conform to the actual operating needs of that app and thereby meet the wake-up needs of different apps while conserving power.

FIG. 1 is a flow chart of a method for waking up an app according to various embodiments of the present application. Process 100 can be implemented by device 600 of FIG. 6 or computer system 700 of FIG. 7. Process 100 can be performed by a device on which an app is installed. As an example, the device can be a mobile terminal, a PC, a tablet, a wearable PC such as a smartwatch, the like, or any other appropriate client terminal on which applications are executed.

At 101, a determination is made as to whether an app has an alarm function. For example, it is determined whether an app has an alarm function. The app can comprise two types of alarm functions—one is to alert user (e.g., wake the user up at 7:00 in the morning), and the other is used only by software only, no signal is provided to user, rather, the alarm is trigger for software running in the background. The alarm function can correspond to a function to alert a user. The alarm function can serve to issue an alert signal to alert the user at a preset time or at a preset interval. 101 can be optionally included in process 100.

Some apps, such as Moji Weather™, have an alarm function to alert users. If power-saving levels are set (e.g., if the app is added to a power-saving app database) for apps that have alarm functions (e.g., native alarm functions), the corresponding alarm functions (e.g., user-alerting alarm functions) of these apps will be affected. For example, if power-saving levels are set for an app that has an alarm function, the app may wake up at times according to the power-saving levels and at times according to the alarm functions. The use of power-saving levels in connection with waking up the app at times according to power-saving levels could decrease the power consumption of the app. Accordingly, before adding an app to a wake-up alarm group, in some embodiments, it is first determined whether the app has such a user-alerting alarm function.

If the app has such a user-alerting alarm function, then no power-saving setting is implemented for the app. If the app does not have such a user-alerting alarm function, then the app is added to the corresponding wake-up alarm group in accordance with the power-saving level in a power-saving app database.

In some embodiments, the determination of whether an app has an alarm function can correspond to the determination of whether the original wake-up time set by the app itself is an integer multiple of minutes. In some embodiments, the determination is made by checking for the original wake-up time in a mapping table of apps and their corresponding original wake-up times. In some embodiments, the determination is made in connection with whether the app sets a wake-up time. If the original wake-up time set by the app itself is an integer multiple of minutes, then the app can be determined to have a user-alerting alarm function.

In the event that the app has an alarm function (e.g., a native alarm function), process 100 can end. In this example, if the app has a native alarm function, no power-saving setting is implemented in relation to the app.

In the event that the app does not have an alarm function, process 100 can proceed to 110.

At 110, an app is added to a wake-up alarm group. The particular wake-up alarm group to which the app is added can be selected according to a power-saving level associated with an app. For example, a power-saving level associated with the app can be set (e.g., selected) and the app can be added to the wake-up alarm group corresponding to the set power-saving level. The power-saving level can be set by a user (e.g., according to user settings or user preferences), by the device on which the app is installed, the like, or any combination thereof. The power-saving level associated with the app can be set according to a power-savings level needed/desired for the app, and the app is added to the appropriate wake-up alarm group. Different power-saving levels (and wake-up alarm groups) correspond to different wake-up time intervals. According to various embodiments, a wake-up time interval is an amount of time after which an app is woken up after having been placed in (set to) a sleep state.

According to various embodiments, a power-saving setting for each app associated with an alarm setting is carried out in a separate management application. For example, the power-saving setting for each app in need of an alarm setting is configured using user interfaces provided by a management application. A power-saving setting for each app can be set via a user interface, or the corresponding setting can be downloaded from a server after boot up by the device (e.g., after a first boot up of the device). After carrying out the power-saving settings of each app (e.g., after configuring each corresponding app with an associated power-saving setting), the original alarm wake-up time that had been set by each app itself (e.g., the wake-up time configured by the developer of the app) becomes void, and multiple apps uniformly use wake-up times after they have been made consistent (e.g., after the wake-up times respectively associated with the multiple apps in the corresponding wake-up group are aligned).

In some embodiments, different power-saving levels correspond to different wake-up time intervals. For example, power-saving level 1, power-saving level 2, and power-saving level 3 respectively correspond to no wake-up, a wake-up interval of 30 minutes, and a wake-up interval of 5 minutes. Other power-saving levels to wake-up intervals mapping can be used.

In some embodiments, the power-saving levels associated with the apps are configured according to a real-time need for information associated with the app. For example, an app's need for information (e.g., a user's need for information via the app) can change (e.g., can be dynamic). The power-saving level associated with the app can be configured (e.g., automatically by one or more processors) according to the app's current need for information. An app's current need for information can be determined according to whether the app is configured to access the internet or communicate over a network, whether the app performs instant messaging or other real-time communication functions, or the like. The real-time need for information associated with the app can be configurable by a user according to user settings, user preferences, or the like. Accordingly, the power-saving level associated with an app can be dynamic.

According to various embodiments, an app's real-time need for information includes the user's communication delay requirement for the app. For example, the real-time need for information can include: message delivery must be instantaneous, message delivery can be delayed, no real-time message delivery requirement, etc. In some embodiments, real-time need for information associated with a particular app can be input by the user via a user setting interface and stored in a configuration file; in some embodiments, the real-time need for information for the app can be obtained from a network, such as a configuration file stored on a server.

According to various embodiments, power-saving levels associated with corresponding apps that conform to the user's actual needs can be set based at least in part on the real-time need for information. For example, in the case of communication software such as WeChat™, because the user requires (e.g., uses) instant messaging of the software, the power-saving level for this type of communication software can be set to power-saving level 3 (e.g., a power-saving level corresponding to a wake-up time interval of five minutes). In the case of software such as Sina Weibo™ or Twitter™, the applications have lower real-time requirements because the user can tolerate delayed communication for this type of software, and thus the power-saving level for this type of communication software can be set to power-saving level 2 (e.g., a power-saving level corresponding to a wake-up time interval of 30 minutes). In the case of query-type software such as Youdao Dictionary™ or Yahoo!™ Web search, the user generally has no real-time communication requirements for this type of software. Thus, the power saving for this type of software is set to power-saving level 1 (e.g., a power-saving level corresponding to no wake-up).

According to various embodiments, different power-saving levels may be set corresponding to different wake-up alarm groups. In addition, an alarm wake-up time window corresponding to the app can be determined according to the power-saving level of the app. In some embodiments, the alarm wake-up time window corresponds to a time period during which the corresponding app is woken up. For example, an app can be woken up at any time during the corresponding alarm wake-up time window. The wake-up alarm group to which an app belongs corresponds to an intersection of the wake-up time window corresponding to the wake-up alarm group and the alarm wake-up time window corresponding to the app. For example, the wake-up alarm group corresponding to an app is the alarm group at least partially overlapping the wake-up time window of the app and the alarm wake-up time window. Implementations for determining the wake-up alarm group to which the app belongs are discussed in further detail in connection with FIGS. 2 and 3.

In some embodiments, a power-saving app database is configured. The power-saving levels associated with an app are added to the power-saving app database. The power-saving app database can store mappings of power-saving levels and corresponding apps. In the event that a power-saving level associated with an app is set, the power-saving app database is updated to store the association of the power-saving level with the app. The power-saving level database can be a local database on the user terminal or a remote database accessible over a network. The user terminal can fetch the current power-saving level for the app from the power-saving app database. Updating of the database is described in further detail in connection with FIG. 4.

At 120, the alarm wake-up time of each app in the wake-up alarm group is adjusted. The alarm wake-up time of an app can be adjusted contemporaneously with adjustment of other apps in the wake-up alarm group or in connection with the app being added to the wake-up alarm group. In some embodiments, the alarm wake-up time of each app is adjusted to make the alarm wake-up times corresponding to the respective apps in the wake-up alarm group consistent. According to various embodiments, alarm wake-up times are deemed to be consistent if the alarm wake-up times are the same. Accordingly, adjustments to alarm wake-up times of apps are made to cause the apps to have the same alarm wake-up time. The wake-up intervals can be determined based at least in part on the power-saving level. The wake-up intervals can be set after the device is configured or in response to a change in corresponding settings in connection with an input from a user via a user interface, or an update provided from a server.

After the app is added to the appropriate wake-up alarm group, the alarm wake-up times of all the apps in the wake-up alarm group are aligned. Specifically, the alarm wake-up times of the apps are set to the same value in the database. In some embodiments, the alarm wake-up time of the app is manually set by the user as the alarm wake-up time of all the apps previously included in the wake-up alarm group; in some embodiments, the alarm-wake up time of the app is automatically set as the alarm wake-up time for all the apps previously included in the wake-up alarm group in response to the app being added to the wake-up alarm group. In some embodiments, in response to the app being added to the wake-up alarm group, the alarms corresponding to all the apps in the wake-up alarm group are reset (or updated) to the same wake-up time.

At 130, the apps in the wake-up alarm group are woken up at the wake-up time associated with the wake-up alarm group. In some embodiments, the apps in the wake-up alarm group are configured to monitor (e.g., wait on) an alarm timer while they are in standby mode.

At the wake-up time, all the apps in the wake-up alarm group uniformly use the aligned wake-up time for unified waking up of all the apps in the wake-up alarm group. According to various embodiments, reducing the wake-up frequency of the operating system increases operating system sleep time, and thus terminal power can be conserved.

In some embodiments, 130 includes, upon determining that the terminal on which the app is installed is in standby mode, monitoring the wake-up time after the alarms corresponding to every app in the wake-up alarm group has been adjusted to make the alarm corresponding to each app consistent. Specifically, at the wake-up time, the operating system notifies the apps in the wake-up alarm group that the alarm timer has gone off, thus causing the apps to wake up. In addition, in the event that the alarm wake-up time is detected (e.g., by the monitoring) after the alarm wake-up time of each app in the wake-up alarm group is adjusted, all of the apps in the wake-up alarm group are woken up (e.g., put into active mode where the apps are performing operations rather than waiting for the wake-up timer).

In some embodiments, process 100 is activated only when the terminal is in standby mode because a power-saving strategy is designed to restrict apps running in the background rather than apps that are currently executing. For example, in some embodiments, in the event that the terminal is in the operating mode, the terminal uses the original alarm wake-up time that was set by the app itself. In the event that the terminal is in the standby mode, the terminal typically cuts power to the screen such that the screen is blank. Accordingly, a determination of whether the terminal is in the operating mode or the standby mode can be made by monitoring the state of the screen (e.g., by invoking an operating system supported application programming interface (API) call to check whether the screen is active). In some embodiments, in the event that the terminal is determined to be in operating mode, the alarm wake-up times of the apps in every wake-up alarm group are restored to the original non-power-saving mode wake-up times. Monitoring of the alarm wake-up times following adjustments for every app in the wake-up alarm groups is not performed when the terminal is determined to be in operating mode. In some embodiments, in the event that the terminal is determined to be in standby mode, the alarm wake-up times of apps in the wake-up alarm group are monitored to determine whether the alarms corresponding to each app in the wake-up alarm group are consistent. The alarm wake-up times of apps in the wake-up alarm group can be monitored following adjustments to each app in the various wake-up alarm groups to make the alarms corresponding to each app in the various wake-up alarm groups consistent across the respective wake-up alarm group. The alarm wake-up times of apps are monitored to determine whether the apps belonging to a particular wake-up alarm group have consistent alarm wake-up times. Different wake-up alarm groups can have different alarm wake-up times that are consistent across their respective apps. In some embodiments, when the terminal switches from standby mode to operating mode, every app is deleted from the corresponding wake-up alarm group, and the original wake-up time of the app is restored. In some embodiments, when the terminal switches from standby mode to operating mode, an app is not deleted from its corresponding wake-up alarm group, however, the alarm wake-up times of the apps in the wake-up alarm groups are set to invalid. In some embodiments, when the terminal switches from standby mode to operating mode, the terminal disables power saving functionality associated with the power-saving levels (e.g., the power-saving levels corresponding to the various wake-up alarm groups). The wake-up alarm groups and the corresponding alarm wake-up times can be retained while the terminal is in the operating mode, however, the disabling of the power saving functionality causes the terminal to not enforce, or otherwise implement, the power-saving levels (e.g., the terminal does not monitor the alarm wake-up times of apps corresponding to the various wake-up alarm groups). For example, according to various embodiments, in the operating mode, the alarms are no longer monitored by the power-saving mechanism, but the alarms are still monitored by the system as though the power-saving mechanism does not exist.

In some embodiments, some apps, such as the 360 virus scan app, which do not have a periodic wake-up mechanism, but which are to be subject to power-saving restrictions, may achieve power-saving by prohibiting the apps from accessing the General Packet Radio Service (GPRS) while running in the background. In some embodiments, the 360 virus app can have a periodic wake-up mechanism, however the primary cause of significant power consumption by the 360 virus scan app is caused by the 360 virus scan app accessing the internet in the background and such access of the internet can last for relatively long times (e.g., hours). Accordingly, power-saving can be achieved by prohibiting the apps from accessing the General Packet Radio Service (GPRS) while running in the background.

In some embodiments, the appropriate wake-up alarm group corresponding to the app is determined according to the power-saving level of the app. Descriptions of various implementations for determining the appropriate wake-up alarm group corresponding to an app are provided in connection with process 200 of FIG. 2 and process 300 of FIG. 3.

Figure 2:
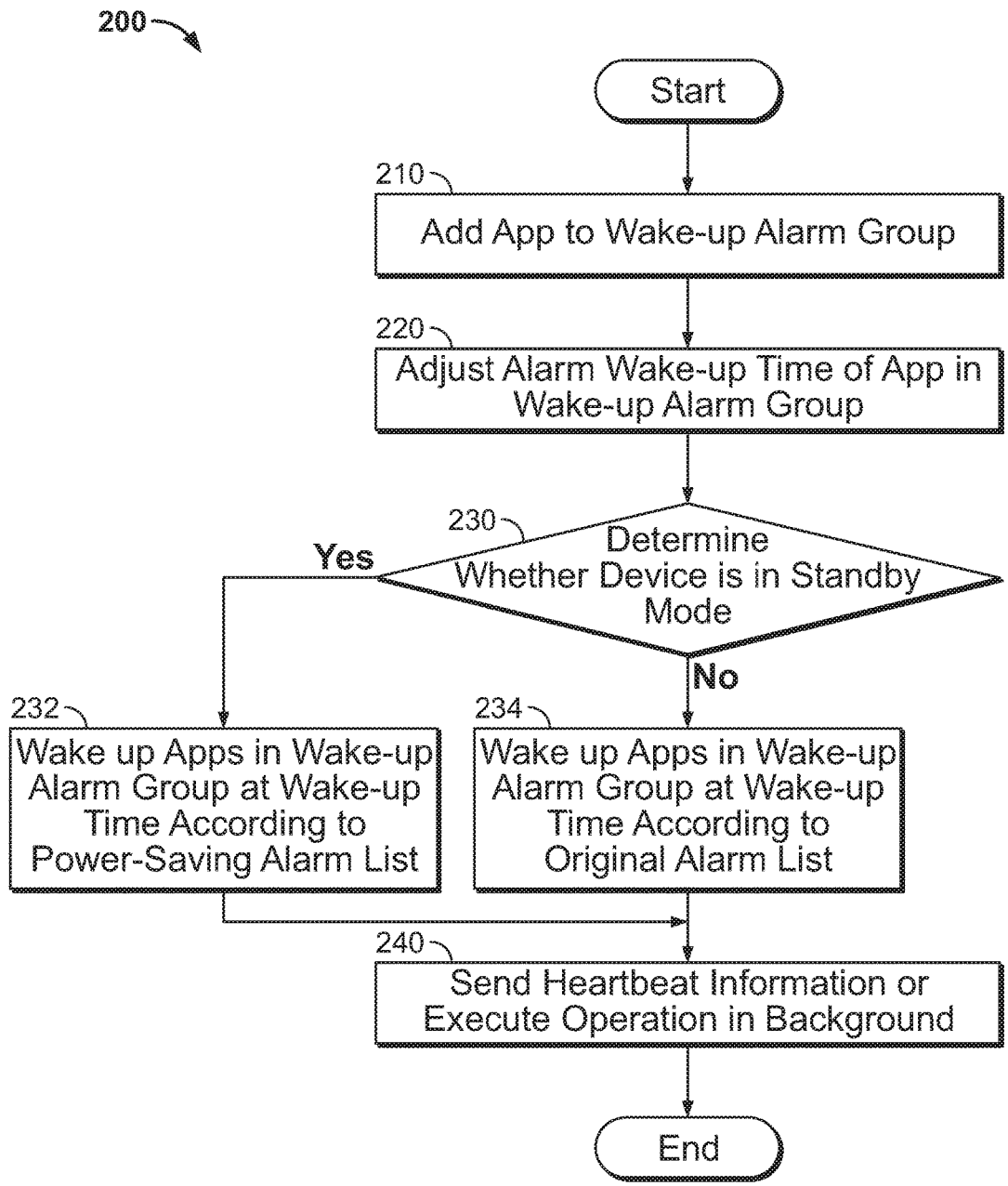
FIG. 2 is a flow chart of a method for waking up an app according to various embodiments of the present disclosure.

FIG. 2 is a flow chart of a process for waking up an app according to various embodiments of the present disclosure. Process 200 can be implemented by device 600 of FIG. 6 or computer system 700 of FIG. 7. Process 200 can be performed by a device on which an app is installed. As an example, the device can be a mobile terminal, a PC, a tablet, a wearable PC such as a smartwatch, the like, or any combination thereof.

At 210, an app is added to a wake-up alarm group. The particular wake-up alarm group to which the app is added can be selected according to a power-saving level associated with an app. For example, a power-saving level associated with the app can be set (e.g., selected) and the app can be added to the wake-up alarm group corresponding to the set power-saving level. The power-saving level can be set by a user (e.g., according to user settings or user preferences), by the device on which the app is installed, the like, or any combination thereof. In the event that the power-saving level is not set by the user, default settings can be used. The power-saving level associated with the app can be set according to a power-saving level needed/desired for the app, and the app is added to the appropriate wake-up alarm group. In some embodiments, a mapping relationship between the power-saving level and a wake-up alarm group is set. The mapping relationship between the power-saving level and the wake-up alarm group can be stored (e.g., in a power-saving app database). The app is added to the appropriate wake-up alarm group (e.g., according to the power-saving level associated with the app). Different power-saving levels (and wake-up alarm groups) correspond to different wake-up time intervals.

According to various embodiments, various different power-saving levels correspond to various wake-up alarm groups. For example, three wake-up alarm groups are set. The three wake-up alarm groups include a wake-up alarm group having a wake-up time interval set to 5 minutes, a wake-up alarm group having a wake-up time interval set to 30 minutes, and a wake-up alarm group for which wake-up is prohibited.

At 220, the alarm wake-up time of each app in the wake-up alarm group is adjusted. In some embodiments, the alarm wake-up time of each app is adjusted to make the alarm wake-up times corresponding to the respective apps in the wake-up alarm group consistent. According to various embodiments, alarm wake-up times are deemed to be consistent if the alarm wake-up times are the same. Accordingly, adjustments to alarm wake-up times of apps are made to cause the apps to have the same alarm wake-up time. A file or other record storing alarm wake-up times (or intervals) of each app can be updated to store consistent alarm wake-up times for each app in a particular wake-up alarm group. As an example, assuming two alarms have the same time window 10 minutes, a first alarm is set to 1:30, and the second alarm is set to 1:33. The range (e.g., the wake-up intervals) of the first alarm is 1:30-1:40, and the range of the second alarm is 1:33-1:43. Accordingly, the first alarm and the second alarm overlap at 1:33-1:40. Therefore, the first alarm and the second alarm can be set to belong to a group (the first and the second alarm can a group). In the event that a third alarm is added and the time of time of the third alarm is set to 1:38 and time window is also 10 minutes, then the range of the third alarm is 1:38-1:48. Accordingly, the third alarm overlaps with the group comprising the first alarm and the second alarm. As a result, the third alarm can be added to the group comprising the first alarm and the second alarm, and the group range can be to 1:38-1:40. According to various embodiments, any time within the range can be selected and the wake-up of the apps belonging to the group can be triggered at any time within the range (e.g., all of the first alarm, the second alarm, and the third alarm can be woken up at 1:39).

In some embodiments, the wake-up time for the app is set to the wake-up time that was previously set for the corresponding wake-up alarm group.

The apps in the wake-up alarm group are woken up at the wake-up time according to the appropriate wake-up alarm list (e.g., an original alarm list, a power-saving alarm list, or the like). The appropriate wake-up alarm list can be determined (selected) according to whether the device (e.g., the terminal) is in a standby mode or an operating mode and/or according to the particular wake-up alarm group to which the app belongs. In some embodiments, the alarm is only adjusted in relation to standby mode of the device. If the device is switched to operating mode, the original alarm is resumed and the alarm list or group is adjusted accordingly. A process for waking up an app according to the appropriate wake-up alarm list can optionally include 230, 232, and 234 to wake up the app. For example, all apps in the wake-up alarm group wake-up at the wake-up time associated with the wake-up alarm group. At the wake-up time after the alarms corresponding to every app in the wake-up alarm group has been adjusted to make the alarm corresponding to each app consistent, all the apps in the wake-up alarm group wake up. For example, at the wake-up time following adjustment of the alarms corresponding to the apps in the wake-up alarm group, the apps in the wake-up alarm group are woken up. In some embodiments, the terminal can reference a file which stores the default power-saving level for apps. The wake-up time is set dynamically during run-time according to the original time set by app and the power-saving level.

According to various embodiments, every app in each wake-up alarm group uses the same wake-up time for waking up all the apps in the group. Accordingly, when a current time corresponds to a wake-up time associated with a wake-up alarm group, every app in the wake-up alarm group is woken up (contemporaneously).

Android can manage alarms and set wake-up times using the file "AlarmManagerService.java." Process 200 can be implemented on a device running Android 4.4 (Cloud OS 3.0) Version 4.4 and earlier, or similar operating systems. In these operating system versions, the file "AlarmManagerService.java" includes alarm wake-up times for each app. The file "AlarmManagerService.java" can be updated in connection with 210 and 220 of process 200.

In some embodiments, apps are configured with original wake-up times set by the apps' own alarms. The operating system of the terminal puts the original wake-up times set by these apps into a group alarm list. The group alarm list that includes the original wake-up times set by the apps is referred to as the original alarm list. According to various embodiments, various power-saving alarm lists can be added according to the particular power-saving level (e.g., wake-up times or policy of wake-up times). For example, other power-saving alarm lists (e.g., respectively associated with the wake-up alarm groups described above) can be added to the AlarmManagerService.java file. As an example, three power-saving alarm lists can be added: a 5-minute alarm list (e.g., associated with an alarm wake-up time set to 5 minutes), a 30-minute alarm list (e.g., associated with an alarm wake-up time set to 30 minutes), and a no-wakeup alarm list (e.g., associated with wake-up alarm groups for which wake-up is prohibited). The power-saving alarm lists (associated with the wake-up alarm groups) differ from the original alarm list based at least on the fact that the alarms in the original alarm list will punctually wake up the corresponding app according the wake-up time set by the app, but the alarms in the power-saving alarm list will wake up to the corresponding apps according to the associated wake-up time or policy of the wake-up time (e.g., periods of 5 minutes or 30 minutes or will prohibit background waking of the corresponding app). In the event that an alarm is to be set for an app, it is determined whether the app is in the list of power-saving apps in the power-saving database. If the app is in the list of power-saving apps in the power-saving database, the app is included in the appropriate power-saving alarm list depending on the associated power-saving level in the power-saving app database. If the app is not in the list of power-saving apps in the power-saving database, then the app is included in the original alarm list. If an alarm wake-up time in a power-saving alarm list is reached when the terminal switches from standby to operating mode (e.g., when the screen switches from "screen off" to "screen on"), the app corresponding to the alarm will be woken up, and all alarms associated with wake-up times that have not yet arrived or which very recently arrived are moved to the original alarm list (or the alarm of every app in the power-saving alarm lists is set to invalid). The alarm wake-up times for the apps in the original alarm list are monitored. In some embodiments, in response to the terminal switching from operating to standby mode, the apps in the original alarm list are transferred to the power-saving alarm lists. In some embodiments, in response to the terminal switching from operating to standby mode, the alarms of every app in the original alarm list are set to invalid. The alarm wake-up times of the apps in the power-saving alarm lists are monitored.

At 230, it is determined whether the device is in standby mode. For example, the terminal determines whether the terminal is in standby mode or operating mode.

In the event that the device is in standby mode, at 232, apps in the wake-up alarm group are woken up at the wake-up time according to the power-saving alarm list corresponding to the wake-up alarm group. When the device is in the standby mode, a particular app is woken up according to a power-saving alarm list corresponding to the wake-up alarm group to which the particular app belongs. After the app is woken up, process 200 proceeds to 240.

In the event that the device is not in standby mode (e.g., the device is in operating mode), at 234, apps in the wake-up alarm group are woken up at the wake-up time according to the original alarm list corresponding to the alarm. When the device is in the operating mode, a particular app is woken up according to a corresponding original alarm list. After the app is woken up, process 200 proceeds to 240.

At alarm wake-up time, the corresponding app is woken up. In response to an app waking up, at 240, the app sends heartbeat information or executes other operations in the background. 240 can be optionally performed. In some embodiments, in response to being woken up, an app can perform a corresponding action or function.

Figure 3:
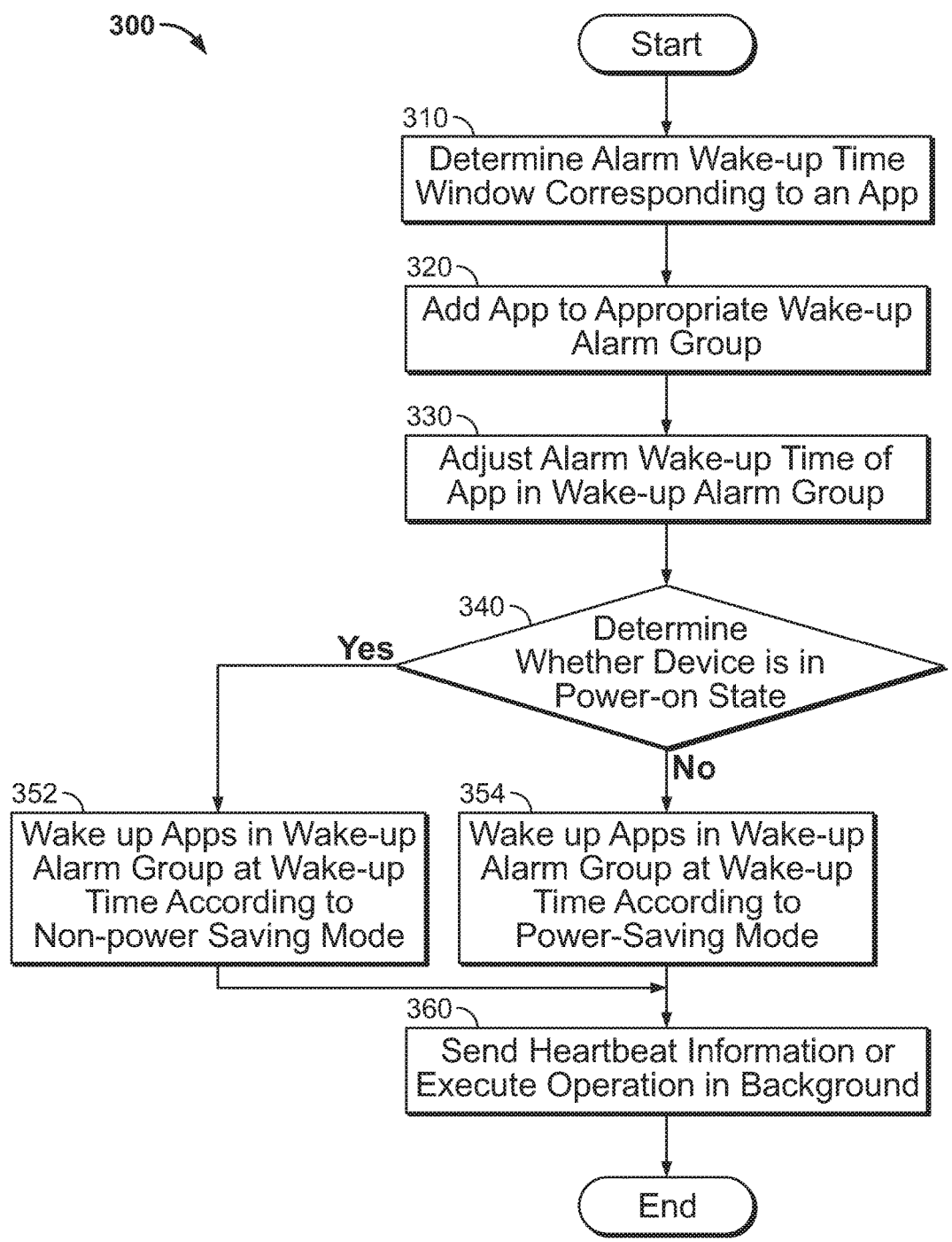
FIG. 3 is a flow chart of a method for waking up an app according to various embodiments of the present disclosure.

FIG. 3 is a flow chart of another process for waking up an app according to various embodiments of the present disclosure. Process 300 can be implemented by device 600 of FIG. 6 or computer system 700 of FIG. 7. Process 300 can be performed by a device on which an app is installed. As an example, the device can be a mobile terminal, a PC, a tablet, a wearable PC such as a smartwatch, the like, or any combination thereof.

At 310, an alarm wake-up time window corresponding to an app is determined. The alarm wake-up time window corresponding to the app can be determined according to the power-saving level associated with (e.g., configured for) the app (e.g., an app having an alarm that is to be set), the most recent wake-up for the app, the length that was set for the wake-up time window, the like, or any combination thereof.

At 320, the app is added to the appropriate wake-up alarm group. The wake-up alarm group to which the app is to be added can be determined based at least in part on the alarm wake-up time window. For example, the app can be added to the wake-up alarm group for which the wake-up time window of the alarm group and the alarm wake-up time window corresponding to the app intersect. In some embodiments, the app is added to the appropriate wake-up alarm group by adding the alarm associated with the app to the wake-up alarm group. Each alarm associated with an app can include information relating to the app to which the alarm is associated. Accordingly, when the alarm is triggered to wake-up, the alarm can notify the associated app. The wake-up time window corresponding to an app can be deemed to intersect the wake-up time window of an alarm group if the wake-up time window corresponding to the app at least partially overlaps with the wake-up time window of the alarm group. In the event that a wake-up time window corresponding to an app overlaps with more than one wake-up time window of different wake-up alarm groups, the app can be added to one of the different wake-up alarm groups. The device can select which of the different wake-up alarm groups to which the app is added based on a degree to which the wake-up time window corresponding to the app overlaps with the wake-up time window of the corresponding wake-up alarm groups, an app type of the app, a priority of the app, a number of apps belonging to the respective wake-up alarm groups, or the like. In some embodiments, the length of the wake-up time window corresponds to the maximum length of time that wake-up can be delayed. In some embodiments, the alarm wake-up time window corresponding to the app is the time interval during which the app can be woken up.

The alarm wake-up time window corresponding to the app is set. The wake-up time window is a time period during which the app may be woken up. For example, the app can be woken up at any time during the time period corresponding to the wake-up time window associated with the app. Determining a wake-up time period for waking up an app can be made according to one or more of a corresponding power-saving level (e.g., wake-up time interval), a most recent wake-up time for the app, and a preconfigured wake-up time window length. For example, if the wake-up time interval corresponding to the power-saving level associated with the app is 30 minutes, the most recent time at which the app was woken up was 11:30, and the wake-up time window length is set to 3 minutes, then the alarm wake-up time window corresponding to the app determined for the next wake-up of the app is 12:00-12:03.

At 330, the alarm wake-up time of each app in the wake-up alarm group is adjusted. In some embodiments, the alarm wake-up time of each app is adjusted to make the alarm wake-up times corresponding to the respective apps in the wake-up alarm group consistent. For example, the alarm wake-up time of each app is adjusted to cause the alarm wake-up times to be the same for the respective apps in the wake-up alarm group.

In some embodiments, alarms associated with apps that intersect with the wake-up time window are assigned (e.g., added) to a wake-up alarm group. After the app is added to the appropriate wake-up alarm group, the intersection between the alarm wake-up time window of the app and the alarm wake-up time window of the wake-up alarm group is determined. The alarm wake-up time window of a wake-up alarm group can be determined according to an intersection of the wake-up time of a plurality of alarms in the wake-up alarm group. For example, the intersection of the wake-up time of every alarm in the wake-up alarm group is determined as the alarm wake-up time window of the wake-up alarm group. In some embodiments, any time within the alarm wake-up time window of the wake-up time alarm group can be selected to serve as the consistent (e.g., aligned) wake-up time. In some embodiments, the earliest wake-up time corresponding to the alarm wake-up time window of the wake-up alarm group serves as the consistent (e.g., aligned) wake-up time.

An app in a wake-up alarm group is woken up at the wake-up time corresponding to the wake-up alarm group. For example, at a wake-up time after every app alarm in the wake-up alarm group has been adjusted to make the alarm wake-up times corresponding to the respective apps in the wake-up alarm group consistent, all the apps in the wake-up alarm group are woken up.

When the aligned alarm wake-up time of every app in the corresponding wake-up alarm group is reached, all of the apps in the corresponding wake-up alarm group are woken up. In some embodiments, the terminal can reference a file which stores the default power-saving level for apps. The wake-up time is set dynamically during run-time according to the original time set by app and the power-saving level. The file or other type of record storing alarm wake-up intervals of each app can store an indication of the wake-up alarm group to which the each corresponding app belongs. In some embodiments, a file is generated or configured for each wake-up alarm group such that the file stores an indication of the apps belonging to the corresponding wake-up alarm group, or the alarm wake-up time (or interval) associated with the wake-up alarm group.

The apps in the wake-up alarm group are woken up at a wake-up time determined according to whether the device (e.g., the terminal) is in an "active" state or an "inactive" state. For example, the wake-up time can be determined according to whether the screen of the device is on or off. The device can be deemed to be in an "inactive" state in the event that the screen is determined to be off. Conversely, the device can be deemed to be in an "active" state in the event that the screen is determined to be on. Similarly, the device can be deemed to be in an "inactive" state in the event that the device is in a standby mode (e.g., a power-saving mode), and the device can be deemed to be in an "active" state in the event that the device is in an operating mode (e.g., a non-power-saving mode). A process for waking up an app according to whether the device is in an "active" state or an "inactive" state can optionally include 340, 352, and 354 to wake up the app. For example, all apps with corresponding alarms and/or wake-up times are woken up according to whether the device is in an "active" state or an "inactive" state.

Process 300 can be implemented by a device running (e.g., executing) Android Version 4.4 (Cloud OS 3.0) or another similar operating system. For example, process 300 can be implemented by a device running an operating system that stores and uses a file that manages or otherwise stores alarms corresponding to respective apps installed on the device. In Android Version 4.4 (Cloud OS 3.0), the alarm list in the "AlarmManagerService.java" file is canceled and replaced with a "Batch" list. "Batch" is a new class in Android 4.4. In some embodiments, a "Batch" list includes a group of alarms that can be simultaneously (or contemporaneously) woken up. When the alarm wake-up time window is being set for every app, a time window length (windowLength) parameter is added to the original trigger time (triggerAtTime) parameter. The length parameter indicates that apps may be woken up at any time in the segment of time from triggerAtTime to triggerAtTime+windowLength. If the alarm wake-up time windows for different apps intersect, the alarms for these apps are assigned to the same batch, and the apps are simultaneously woken up.

Specifically, with regard to Android 4.4, the class "Alarm" has fields for user-set original wake-up time and user-set latest wake-up time. According to various embodiments, fields in the class "Alarm" can be added. For example, fields that can be added to the "Alarm" class can include a wake-up time after power-saving adjustment, a latest wake-up time after power-saving adjustment, an indication of whether a power-saving alarm is used (e.g., a binary, or yes or no representation), and a power-saving level. The time between the wake-up time after power-saving adjustment and the latest wake-up time after power-saving adjustment (which includes the wake-up time after power-saving adjustment and the latest wake-up time after power-saving adjustment) can correspond to the alarm wake-up time window after carrying out the power-saving setting. In the event that an alarm corresponding to an app is set, the alarm wake-up time window corresponding to the app is determined according to the power-saving level stored in association with the app in the power-saving app database. In some embodiments, the original wake-up time window corresponding to the app (e.g., an original wake-up time that is default for the app or otherwise configured by a developer of the app or by the device based at least in part on user settings or preferences) in non-power-saving mode (e.g., when the device is in the operating mode) is saved. The app is added to the appropriate batch. For example, the app can be added to the appropriate batch in response to the wake-up time window corresponding to the app is determined. In some embodiments, when the screen of the device is in a "power on" state, the alarm wake-up time window for the app is restored to the initial wake-up time window in non-power-saving mode, and the app is withdrawn from the batch to which the app currently belongs. In addition, the app is added to a new batch in accordance with the restored initial wake-up time window in non-power-saving mode. In some embodiments, when the screen is in a "power off" state, the wake-up time window for the app is set in accordance with the power-saving app database to the wake-up time window in power-saving mode, and the appropriate batch is updated.

At 340, it is determined whether the device is in a "power-on" state. For example, the device can determine whether the device is in a "power-on" state or a "power-off" state. The device can determine whether the device is in a "power-on" state or a "power-off" state according to whether the screen of the device is on or off. A screen that is on can be indicative of the device being in a "power-on" state, and a screen that is off can be indicative of the device being in a "power-off" state.

In the event that the device is in a "power-on" state, at 352, apps in a wake-up group are woken up at a corresponding wake-up time according to a non-power saving mode. For example, the apps are woken up according to the initial wake-up windows respectively corresponding to the apps (e.g., an initial wake-up time that is default for the app or otherwise configured by a developer of the app or by the device based at least in part on user settings or preferences). A batch including the initial wake-up window can be used in connection with waking up an app when the device is in a "power-on" state. After the app is woken up, process 300 proceeds to 360.

In the event that the device is not in a "power-on" state (e.g., the device is in a "power-off" state), at 354, apps in a wake-up group are woken up at a corresponding wake-up time according to a power-saving mode. For example, the apps are woken up according to the wake-up times set in connection with a power-saving function. When the device is in a power-off state, the wake-up times and/or windows that are set for a corresponding app and stored in the power-saving app database are used in connection with waking up the device. In the event that an alarm corresponding to an app is set, the alarm wake-up time window corresponding to the app is determined according to the power-saving level stored in association with the app in the power-saving app database. After the app is woken up, process 300 proceeds to 360.

At alarm wake-up time, the corresponding app is woken up. In response to an app waking up, at 360, the app sends heartbeat information or executes other operations in the background. 360 can be optionally performed. In some embodiments, in response to being woken up, an app can perform a corresponding action or function.

According to various embodiments, a most recently updated power-saving level associated with an app can be fetched (e.g., obtained) from the power-saving app database. The most recently updated power-saving level fetched from the power-saving app database can be used in connection with carrying out the power-saving setting. Accordingly, the power-saving app database is updated with changes to various power-saving settings (e.g., to reflect changes to changes in power-saving levels associated with various apps, or the like). The app name list and the corresponding app power-saving levels in the power-saving app database are promptly updated based on changes thereto.

Figure 4:
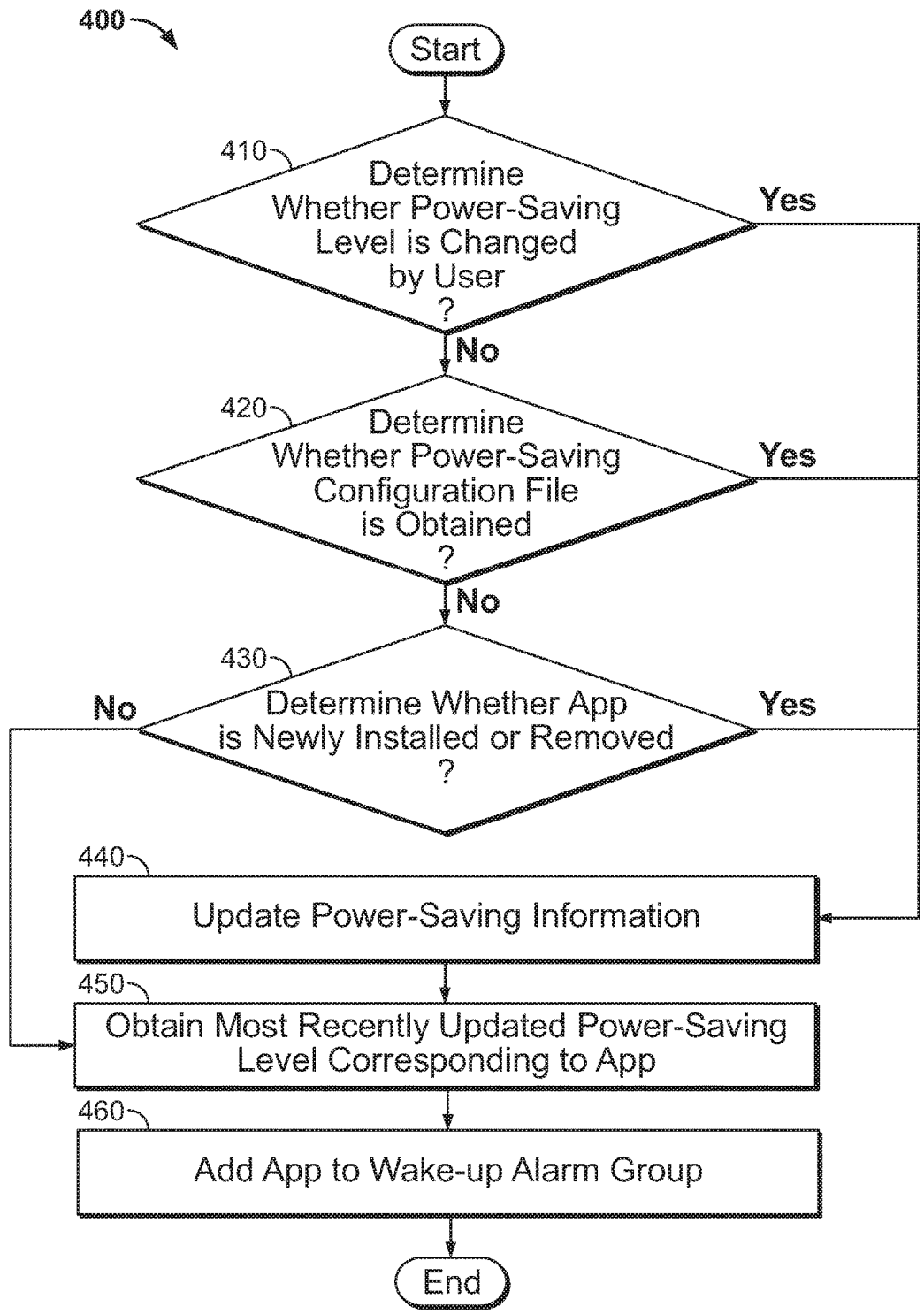
FIG. 4 is a flow chart of a method for managing wake-up of an app according to various embodiments of the present disclosure.

FIG. 4 is a flow chart of a method for managing wake-up of an app according to various embodiments of the present disclosure. Process 400 can be implemented by device 600 of FIG. 6 or computer system 700 of FIG. 7. Process 400 can be performed by a device on which an app is installed. As an example, the device can be a mobile terminal, a PC, a tablet, a wearable PC such as a smartwatch, the like, or any combination thereof.

In some embodiments, the power-saving levels corresponding to an app are managed based on changes in a status of an app (e.g., installation of an app, uninstallation of the app, or the like), in user preferences or settings, and/or power-saving configurations. The information associated with the power-saving levels corresponding to the app is updated based on such changes. For example, a power-saving app database can be updated in response to such changes.

In some embodiments, the device can determine whether a power-saving app database exists (e.g., whether the device stores a power-saving app database) or whether an existing power-saving app database is empty. In the event that a power saving app database does not exist, then a power-saving app database can be created (or populated) using the power-saving configuration file stored at the device. In some embodiments, the power-saving configuration file that was initially set on the device can be used to create (or populate) the power-saving app database. In some embodiments, a most recently updated (and implemented) power-saving configuration file can be used to create (or populate) the power-saving app database.

At 410, it is determined whether a power-saving level associated with an app is changed by a user. As an example, the app can be changed by a user via a setting interface, a change in user settings or preferences, or the like.

In the event that the power-saving level associated with the app is changed by the user, at 440, corresponding power-saving information is updated. For example, the power-saving app database is updated to reflect the change to the power-saving level associated with the app. Process 400 can thereafter proceed to 450.

In the event that the power-saving level is not changed by the user at 410, at 420, it is determined whether a power-saving configuration file is obtained. For example, it is determined whether a power-saving configuration file sent from network-side equipment after updating is received. The device can further determine whether the power-saving configuration file is to be applied to the device (which would thus result in a change to the power-saving settings and/or information).

In some embodiments, the power-saving configuration file can be formatted as shown in Table 1.

TABLE 1

| AppName | Wake-up Level | Default Setting | User Flag |
| --- | --- | --- | --- |
| App1 | 0 | False | False |
| App2 | 5 | True | False |
| App3 | 5 | True | False |
| App4 | 30 | False | True |
| App 5 | 1 | False | False |

Referring to Table 1, wake-up level 0 indicates that the alarm is never changed (e.g., the wake-up level seems like a white list). The apps with a wake-up level of 0 indicates that the apps have no power-saving restriction, and the corresponding apps do not appear in the user setting interface and the user cannot change the setting. Apps with a wake-up level of −1 indicates that the alarms corresponding to the app are always blocked (e.g., such a wake-up level is designed for those apps that user are not expected to be running in the background). Apps with wake-up levels >0, have wake-up intervals corresponding to the value of the wake-up level (e.g., 5 indicates that the alarm can be delated a maximum of 5 minutes).

A default setting field indicates whether to apply the power-saving level to the corresponding app. For example, the value in default setting field is false, the power-saving mechanism is not used.

A user flag field indicate whether the user has changed the setting, or whether the user can change the power-saving mechanism for the corresponding app. For example, the user flag field can indicate whether the user can switch on/off the power-saving mechanism for the corresponding app.

The power-saving configuration file can include information from which a power-saving app database is configured (e.g., at boot-up of the device). In some embodiments, a power-saving app database is initialized from the configuration file after power up or after the being updated from server. After the power-saving app database initialized, the configuration is read from the power-saving app database (e.g., the configuration file is not used directly because the configuration file can include many uninstalled apps while the database only includes apps that are installed on the device). The power-saving app database is a subset of the information provided in the configuration file.

In the event that a power-saving configuration file is obtained, at 440, corresponding power-saving information is updated. For example, the power-saving app database is updated to reflect the change to the power-saving level associated with the app based on any changes to the power-saving configuration file. Process 400 can thereafter proceed to 450.

In the event that a power-saving configuration file is not obtained, at 430, it is determined whether an app is newly installed or removed (e.g., uninstalled).

In the event that an app is newly installed or removed, it can be further determined whether the app that is newly installed or removed invokes configuration of a power-saving setting (e.g., whether the app has a permission declaration to access). In the event that an app is newly installed or removed, at 440, corresponding power-saving information is updated. For example, the power-saving app database is updated to reflect the change to the power-saving level associated with the app (e.g., to add a power-saving level for a newly installed app, or to remove a power-saving level for a newly removed app). In some embodiments, process 400 proceeds from 430 to 440 in the event that the app that is newly installed or removed invokes configuration of a power-saving setting. After the power-saving app database is updated, process 400 can proceed to 450.

In the event that an app is not newly installed or removed, at 450, a most recently updated power-saving level corresponding to an app is obtained. As an example, the most recently updated power-saving level corresponding to an app (e.g., an app for which an alarm is to be set) is fetched from a power-saving app database that stores information relating to power savings corresponding to apps (e.g., mappings of power-saving levels and corresponding app(s)).

At 460, the fetched power-saving level associated with the app can be used as a basis for adding the app to the appropriate wake-up alarm group. Different power-saving levels correspond to different wake-up time intervals. In some embodiments, the app name list associated with a corresponding wake-up alarm group can be updated (e.g., so as to reflect the updates to the power-saving app database).

According to various embodiments, 410, 420, and 430 can be performed serially (in any order) or in parallel. In some embodiments, satisfaction of other criteria for updating the power-saving information (e.g., other changes to the power-saving level) can be determined.

Figure 5:
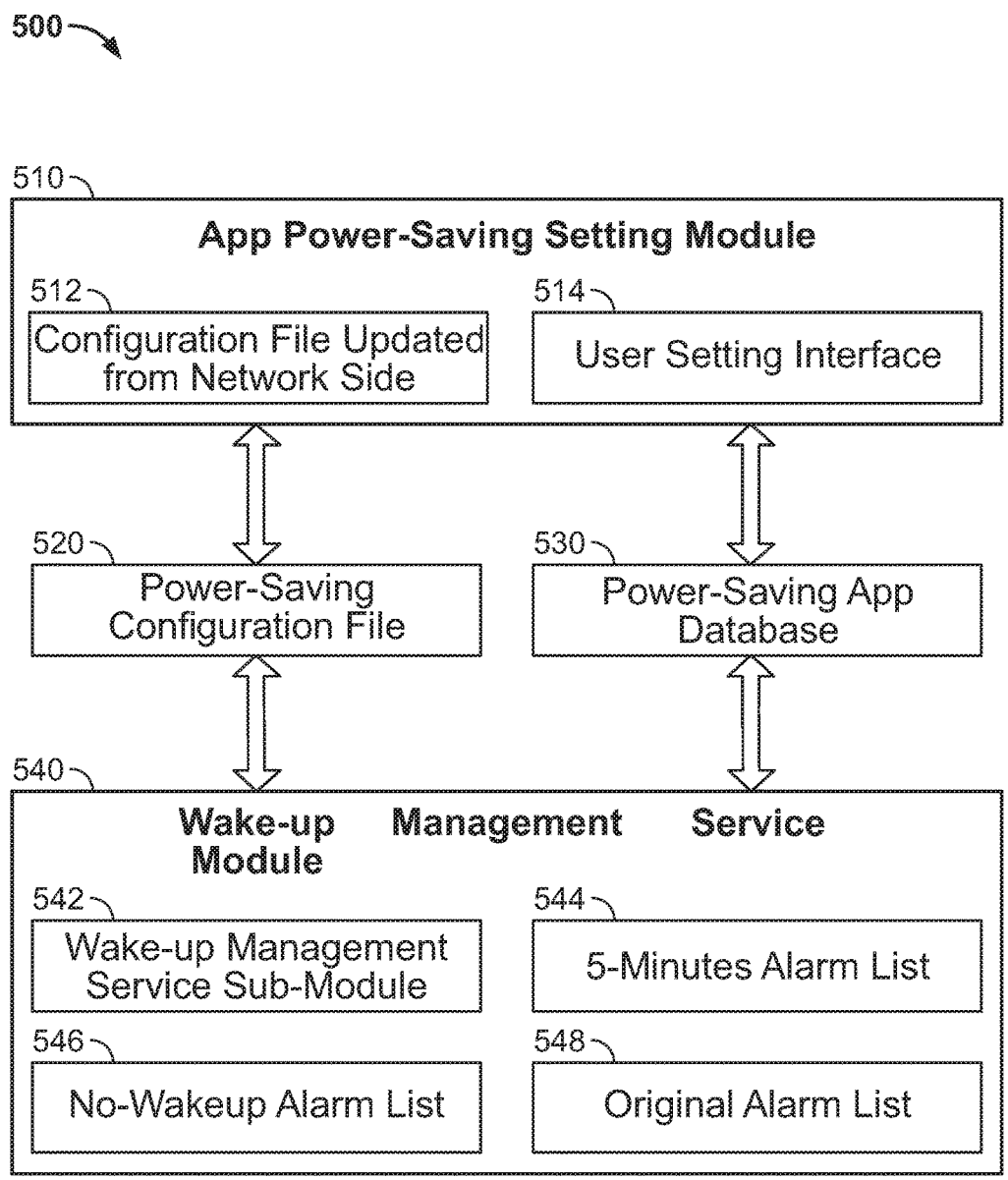
FIG. 5 is a diagram depicting the structural relationships of elements of an app wake-up device according to various embodiments of the present disclosure.

FIG. 5 is a diagram depicting the structural relationships of elements of an app wake-up device according to various embodiments of the present disclosure. Referring to FIG. 5, structural elements of a device 500 for waking-up an app is provided. Device 50 can implement process 100 of FIG. 1, process 200 of FIG. 2, process 300 of FIG. 3, or process 400 of FIG. 4. Device 500 can be implemented by device 600 of FIG. 6 or computer system 700 of FIG. 7. As an example, device 500 can be a mobile terminal, a PC, a tablet, a wearable PC such as a smartwatch, the like, or any combination thereof.

Device 500 includes an app power-saving setting module 510, a power-saving configuration file 520, a power-saving app database 530, and a wake-up management service module 540 (AlarmManagerService) responsible for implementing power-saving settings. The wake-up management service module 540 can include a wake-up management service sub-module 542, a 5-minute alarm list 544, a no-wakeup alarm list 546, and an original alarm list 548. The wake-up management service sub-module 542 can set, update, or reference the various alarm lists 544, 546, and 548 to set the power-level settings associated with an app, or to wake-up an app in accordance with the corresponding alarm wake-up time.

According to various embodiments, the power-saving app database 530 is configured for communication between the app power-saving setting module 510 and the wake-up management service module 540. For example, both the app power-saving setting module 510 and the wake-up management service module 540 can communicate with the power-saving app database 530 to obtain power-saving information (e.g., a power-saving level or indication thereof) corresponding to an app. When the device 500 (e.g., the user terminal) is first powered on and started, the power-saving app database 530 is created according to the power-saving configuration file 520 that was initially set up (or that is otherwise stored on device 500).

According to various embodiments, AlarmManagerService carries out power-saving settings, AlarmManagerService does not directly fetch the power-saving configuration file. Rather, AlarmManagerService can fetch the power-saving app database that was created based on the power-saving configuration file. When the power-saving app database 530 is updated, and the device 500 (e.g., the current terminal) is in standby mode, the app name lists corresponding to a wake-up alarm group are updated (e.g., the app name lists corresponding to each wake-up alarm group can be updated). Specifically, in the event that an app in the power-saving app database 530 is changed to an app that is not in need of a power-saving setting, the app is deleted from the power-saving app database 530. The alarm wake-up time for this app is adjusted to the original wake-up time associated with a non-power-saving mode. For example, the apps are moved from the various power-saving alarm lists (e.g., that are used in connection with a power-saving mode) to the original alarm list (e.g., that are used in connection with a non-power-saving mode). In the event that an app for which a power-saving setting is to be used is added to the power-saving app database 530, the appropriate wake-up alarm group associated with the app and the corresponding wake-up time in power-saving mode are determined according to the power saving level corresponding to the app (e.g., the power-saving level can be determined from the appropriate alarm list). For example, the app is added to the 5-minute alarm list, the 30-minute alarm list, or the no-wakeup alarm list.

The app power-saving setting module 510 provides the user with a user-setting interface 514. The user can change the power-saving level associated with an app using the user setting interface. In response to the user changing the power-saving level associated with the app, the power-saving app database 530 is updated in accordance with the app power-saving level that was changed by the user.

Device 500 can receive a power-saving configuration file 512 from a network side (e.g., from a server that communicates with device 500 over a network). The received power-saving configuration file 512 can be used to update the power-saving configuration file 520 of device 500. In response to the power-saving configuration file 512 being updated on the network side, the updated power-saving configuration file is downloaded from the network side, and the power-saving app database 530 is updated in accordance with the updated power-saving configuration file 520.

Device 500 can install or uninstall apps according to user settings or user preferences, according to administrator control, the like, or any combination thereof. Device 500 can provide a user interface via which the user can instruct device 500 to install or uninstall an app. In response to the user installing a new app, the new app can be configured with a power-saving setting (e.g., an app that has authority to access the Internet). In the event that the app is to be configured with a power-saving setting, the app is added to the power-saving app database 530 in accordance with the power-saving configuration file 520. Similarly, in the event that the user uninstalls an installed app, if the app is in the power-saving app database 530, then the app is deleted from the power-saving app database 530.

In some embodiments, by monitoring system events (e.g., events occurring at the device), promptly learning of all app-related operations for prompt updating of the power-saving app database and subsequent prompt updating of the app name lists in all the wake-up alarm groups is possible. For example, if, after a system power on completion event is detected through monitoring, the current power-saving app database is determined to be empty, a power-saving app database is created in accordance with the power-saving configuration file that was initially set. After monitoring detects an event wherein the user has changed a power-saving level associated with the app through the user setting interface, the power-saving app database is updated in accordance with the power-saving level associated with the app and set by the user. After monitoring detects an app uninstallation event, the device assesses whether the app is in the power-saving app database. If the app is in the power-saving app database, then the device deletes the app from the power-saving app database. After monitoring detects a new app installation event, the device determines whether the app is an app for which a power-saving setting is to be configured. If a power-saving setting associated with the app is to be configured, then the device adds the app to the power-saving app database. After monitoring detects an event wherein the power-saving configuration file on the network side is updated, the device updates the power-saving app database in accordance with the updated power-saving configuration file.

Figure 6:
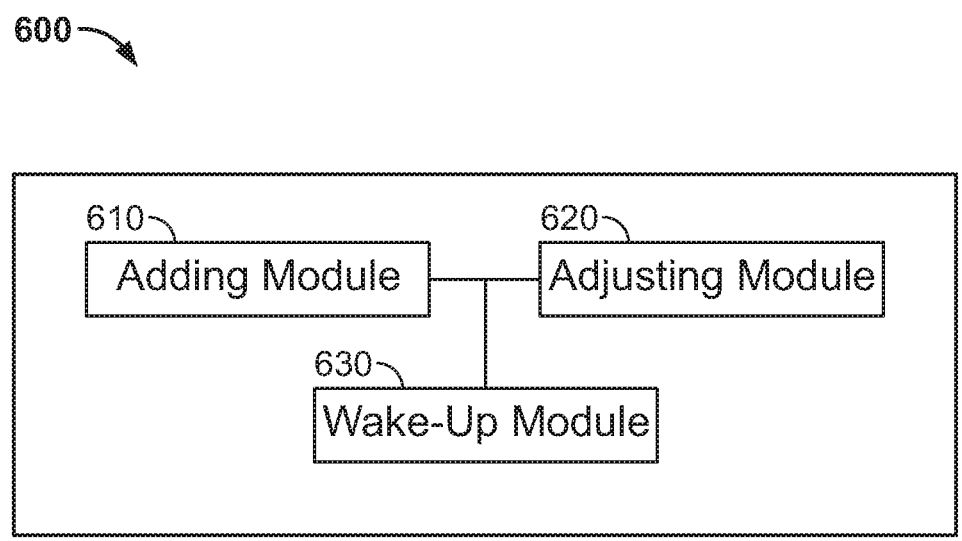
FIG. 6 is a structural diagram of an app wake-up device according to various embodiments of the present disclosure.

FIG. 6 is a structural diagram of an app wake-up device according to various embodiments of the present disclosure. Device 600 can implement process 100 of FIG. 1, process 200 of FIG. 2, process 300 of FIG. 3, or process 400 of FIG. 5. Device 600 can correspond to, or otherwise be implemented by, a computer system 700 of FIG. 7. In some embodiments, device 600 includes an adding module 610, an adjusting module 620, and a wake-up module 630.

In some embodiments, the adding module 610 is configured to set a power-saving level associated with an app. The adding module 610 can set the power-saving level associated with an app according to whether an app is deemed to require, or otherwise necessitate, a power-saving level (e.g., if the app accesses the internet, consumes a relatively large amount of computing resources, the like, or any combination thereof). The adding module 610 is further configured to add the app to the appropriate wake-up alarm group. Different power-saving levels correspond to different wake-up time intervals.

In some embodiments, the adjusting module 620 is configured to adjust the alarm wake-up time of each app in the wake-up alarm group. In some embodiments, the adjusting module 620 adjusts the alarm wake-up time of each app to make the alarm wake-up times corresponding to the respective apps in the wake-up alarm group consistent.

In some embodiments, a wake-up module 630 is configured to wake-up the apps in the wake-up alarm group at the wake-up time. For example, the wake-up module 630 is configured to, at the wake-up time after every app alarm in the wake-up alarm group has been adjusted to make the alarm wake-up times corresponding to the respective apps in the wake-up alarm group consistent, wake up all the apps in the wake-up alarm group.

In some embodiments, the adding module 610 is further configured to add the app to the appropriate wake-up alarm group according to the power-saving level of the app and the mapping relationship between the power saving level and the wake-up alarm group.

In some embodiments, the adding module 610 is further configured to determine the alarm wake-up time window for the app according to the app power-saving level, the most recent wake-up for the app, and the length that was set for the wake-up time window. The adding module 610 can be configured to add the app to the wake-up alarm group for which the wake-up time window and the alarm wake-up time window for the app intersect. The length of the wake-up time window can be the maximum length of time that wake-up can be delayed. The alarm wake-up time window corresponding to the app can be the time interval during which app can be woken up.

In some embodiments, the adding module 610 is configured to, before adding the app to the appropriate wake-up alarm group, determine that the app does not have an alarm function (e.g., to alert the user). The alarm function to alert the user can be a function which at a preset time issues an alert signal to alert the user.

In some embodiments, the adding module 610 configures the power-saving level for the app according to real-time need for information about the app.

In some embodiments, the adding module 610 is configured to fetch the most recently updated power-saving level associated with the app from a power-saving app database. The adding module 610 can use the fetched power-saving level as a basis for adding the app to the appropriate wake-up alarm group.

In some embodiments, the adding module 610 is configured to update the power-saving app database in the event that an app power-saving level is modified by the user through a user setting interface.

In some embodiments, the adding module 610 is configured to update the power-saving app database in the event that a power-saving configuration file (e.g., an updated power-saving configuration file) sent from network-side equipment is received.

In some embodiments, the adding module 610 is configured to update the power-saving app database in the event that a new app for which a power-saving setting is to be configured is installed on the terminal associated with the power-saving app database (e.g., device 600) or an installed app that was in the power-saving app database is removed (e.g., uninstalled) from the terminal associated with the power-saving app database.

In some embodiments, the wake-up module 630 is configured to, upon determining that the terminal on which the app is installed (e.g., device 600) is in standby mode, monitor the alarm wake-up time after every app in the wake-up alarm group has been adjusted to make the alarm wake-up times corresponding to the respective apps in the wake-up alarm group consistent. In the event that the wake-up module 630 detects the alarm wake-up time after the adjustments were made to make the alarm wake-up times corresponding to the respective apps in the wake-up alarm group, the wake-up module 630 wakes up all the apps in the wake-up alarm group.

The modules (or sub-modules) described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 7:
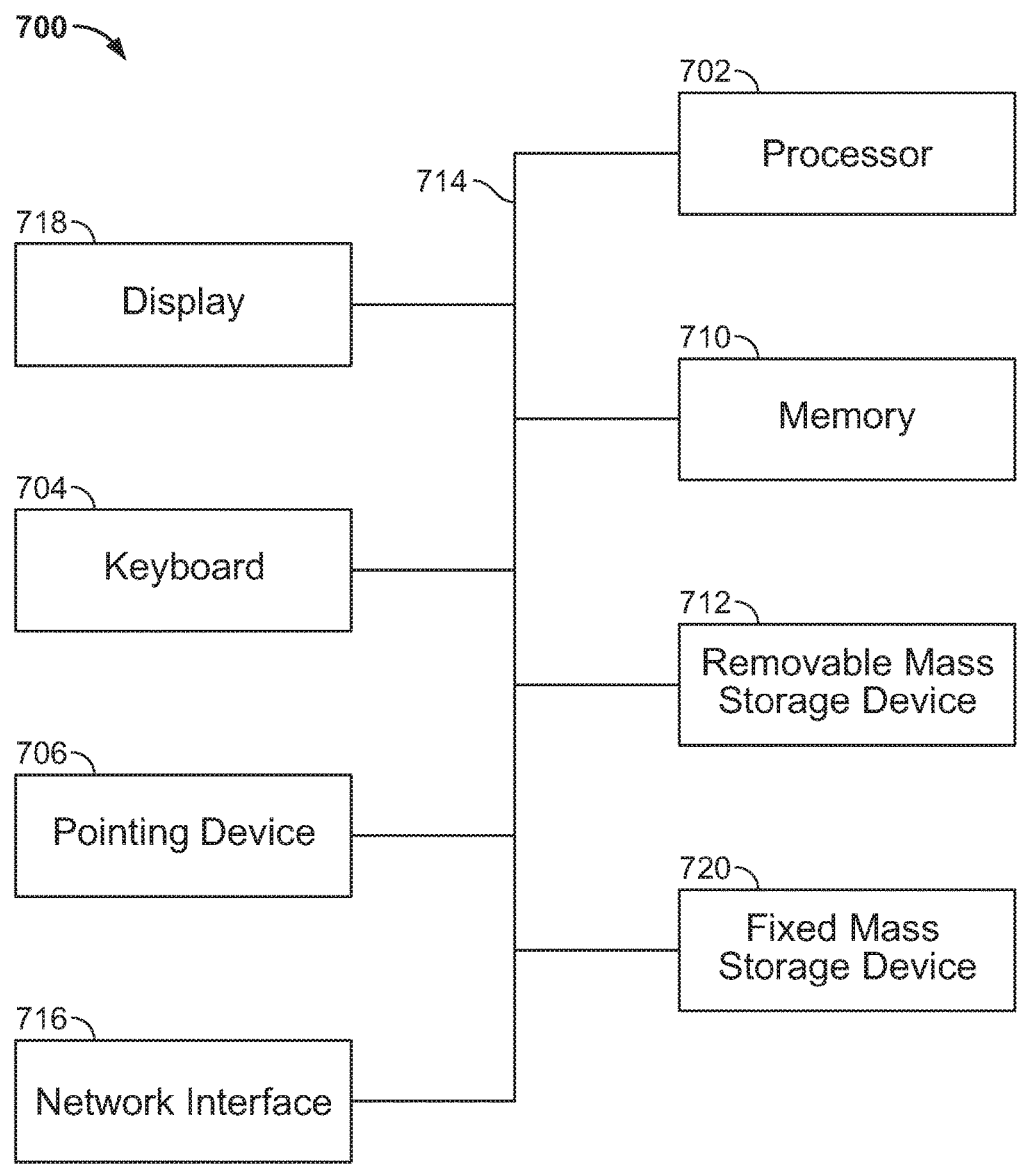
FIG. 7 is a functional diagram of a computer system for waking up an app according to various embodiments of the present application.

FIG. 7 is a functional diagram of a computer system for waking up an app according to various embodiments of the present application.

Referring to FIG. 7, a computer system 700 for waking up an app is displayed. As will be apparent, other computer system architectures and configurations can be used to detect a specified identifier. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718).

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data, and objects used by the processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown). The memory can be a non-transitory computer-readable storage medium.

A removable mass storage device 712 provides additional data storage capacity for the computer system 700, and is coupled either bi-directionally (read/write) or uni-directionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storage device 712 and fixed mass storage 720 generally store additional programming instructions, data, and the like that typically are not in active use by the processor 702. It will be appreciated that the information retained within mass storage device 712 and fixed mass storage 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

A person skilled in the art should understand that the embodiments of the present application can be provided as methods, systems or computer software products. Therefore, the present application may take the form of complete hardware embodiments, complete software embodiments, or embodiments that combine software and hardware. Moreover, the present application may take the form of computer program products implemented on one or more computer-operable storage media (including but not limited to magnetic disk storage, CD-ROMs, and optical storage) containing computer-operable program code.

The present application is described with reference to flow charts and/or block diagrams based on methods, devices (systems) and computer program products. Please note that each flow chart and/or block diagram within the flowcharts and/or block diagrams and combinations of flow charts and/or block diagrams within the flowcharts and/or block diagrams can be realized by computer commands. One can provide these computer commands to a general-purpose computer, a specialized computer, an embedded processor, or the processor of other programmable data equipment so as to give rise to a machine, with the result that the commands executed through the computer or processor of other programmable data equipment give rise to a device that is used to realize the functions designated by one or more processes in a flow chart and/or one or more blocks in a block diagram.

These computer program commands can also be stored on specially-operating computer-readable storage devices that can guide computers or other programmable data equipment, with the result that the commands stored on these computer-readable devices give rise to commodities that include command devices. These command devices realize the functions designated in one or more processes in a flow chart and/or one or more blocks in a block diagram.

These computer program commands can also be loaded onto a computer or other programmable data equipment, with the result that a series of operating steps is executed on a computer or other programmable equipment so as to give rise to computer processing. In this way, the commands executed on a computer or other programmable equipment provide steps for implementing the functions designated by one or more processes in a flow chart and/or one or more blocks in a block diagram Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application.

A person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
adding a first application (app) to a wake-up alarm group comprising a plurality of apps, wherein the wake-up alarm group is selected among a plurality of wake-up alarm groups based at least in part on a power-saving level associated with the first app and a wake-up time information associated with the first app, the wake-up time information comprises a wake-up time window corresponding to the first app, and each of the plurality of wake-up alarm groups is associated with a corresponding alarm wake-up time;
adjusting a plurality of alarm wake-up times corresponding to the plurality of apps in the selected wake-up alarm group, wherein the plurality of alarm wake-up times corresponding to the plurality of apps are adjusted to be consistent; and
waking up the plurality of apps belonging to the wake-up alarm group according to the adjusted alarm wake-up times corresponding to the plurality of apps belonging to the wake-up alarm group.

2. The method of claim 1, further comprising:
setting a power-saving level associated with the app.

3. The method of claim 2, wherein the setting of the power-saving level associated with the first app comprises selecting the power-saving level from a set of a plurality of power-saving levels, wherein the plurality of power-saving levels correspond to different wake-up time intervals.

4. The method of claim 2, wherein the wake-up alarm group is selected based further on a mapping relationship between the power-saving level and the wake-up alarm group.

5. The method of claim 2, wherein the adding of the first app to the wake-up alarm group comprises:
determining an alarm wake-up time window corresponding to the first app according to the power-saving level associated with the first app, a most recent wake-up time of the first app, and a length of the wake-up time window; and
adding the first app to the wake-up alarm group for which a wake-up time window of the group and the alarm wake-up time window corresponding to the app intersect, wherein the length of the wake-up time window corresponds to a maximum length of time that wake-up can be delayed, and the alarm wake-up time window corresponding to the first app corresponds to a time interval during which the first app is to be woken up.

6. The method of claim 2, wherein the adding of the first app to the wake-up alarm group comprises fetching a most recently updated power-saving level associated with the first app from a power-saving app database, and wherein the first app is added to the wake-up alarm group based at least in part on the fetched power-saving level.

7. The method as described in claim 6, further comprising:
updating the power-saving app database in response to:
receiving a modification to an app power-saving level;
receiving an updated power-saving configuration file sent from a server;
installing, on a terminal associated with the power-saving app database, a new app for which a power-saving setting is to be configured; or
uninstalling, from the terminal associated with the power-saving app database, an installed app that is in the power-saving app database.

8. The method of claim 1, further comprising:
determining that the first app does not have an alarm function, wherein the alarm function is a function which at a preset time issues an alert signal, and wherein the first app is added to the wake-up alarm group in the event that that the first app is determined to not have the alarm function.

9. The method of claim 1, further comprising
configuring a power-saving level associated with the first app according to an indication of an extent to which real-time information regarding the first app is expected, wherein the first app is added to the wake-up alarm group according to the power-saving level associated with the first app.

10. The method of claim 1, wherein waking up the plurality of apps belonging to the wake-up alarm group according to the adjusted alarm wake-up times corresponding to the plurality of apps comprises:
in the event that a terminal on which the first app is installed is determined to be in a standby mode, monitoring the adjusted alarm wake-up times corresponding to the plurality of apps;
detecting that the adjusted alarm wake-up times corresponding to the plurality of apps are reached; and
in response to the detection that the adjusted alarm wake-up times corresponding to the plurality of apps are reached, waking up all the apps in the wake-up alarm group.

11. The method of claim 1, further comprising:
determining whether a terminal on which the first app is installed is in a standby mode;
in the event that the terminal is not in a standby mode, waking up the first app according to an initial alarm wake-up time; and
in the event that the terminal is in the standby mode, waking up the first app according to the adjusted alarm wake-up times.

12. The method of claim 1, wherein the power-saving level associated with the first app is determined based at least in part on whether the first app is configured to communicate over a network.

13. The method of claim 1, wherein the power-saving level associated with the first app is determined based at least in part on whether the first app provides a real-time communication function.

14. The method of claim 1, wherein the power-saving level associated with the first app is dynamic and the wake-up alarm group selected among the plurality of wake-up alarm groups is updated dynamically based at least in part on a current power-saving level associated with the first app.

15. A device, comprising:
at least one processor configured to:
add a first application (app) to a wake-up alarm group comprising a plurality of apps, wherein the wake-up alarm group is selected among a plurality of wake-up alarm groups based at least in part on a power-saving level associated with the first app and a wake-up time information associated with the first app, the wake-up time information comprises a wake-up time window corresponding to the first app, and each of the plurality of wake-up alarm groups is associated with a corresponding alarm wake-up time;
adjust a plurality of alarm wake-up times corresponding to the plurality of apps in the selected wake-up alarm group, wherein the plurality of alarm wake-up times corresponding to the plurality of apps are adjusted to be consistent; and wake up the plurality of apps belonging to the wake-up alarm group according to the adjusted alarm wake-up times corresponding to the plurality of apps belonging to the wake-up alarm group; and a memory coupled to the at least one processor and configured to provide the at least one processor with instructions.

16. The device of claim 15, wherein the at least one processor is further configured to:
set a power-saving level associated with the first app.

17. The device of claim 16, wherein the at least one processor is further configured to select the power-saving level from a set of a plurality of power-saving levels, wherein the plurality of power-saving levels correspond to different wake-up time intervals.

18. The device of claim 16, wherein the wake-up alarm group is selected based further on a mapping relationship between the power-saving level and the wake-up alarm group.

19. The device of claim 16, wherein the at least one processor is further configured to:
determine an alarm wake-up time window corresponding to the first app according to the power-saving level associated with the first app, a most recent wake-up time of the first app, and a length of the wake-up time window; and add the first app to the wake-up alarm group for which a wake-up time window of the group and the alarm wake-up time window corresponding to the app intersect, wherein the length of the wake-up time window corresponds to a maximum length of time that wake-up can be delayed, and the alarm wake-up time window corresponding to the first app corresponds to a time interval during which the first app is to be woken up.

20. The device of claim 19, wherein the at least one processor is further configured to add the first app to the wake-up alarm group by fetching a most recently updated power-saving level associated with the first app from a power-saving app database, and wherein the first app is added to the wake-up alarm group based at least in part on the fetched power-saving level.

21. The device of claim 20, wherein the at least one processor is further configured to:
update the power-saving app database in response to:
receiving a modification to an app power-saving level;
receiving an updated power-saving configuration file sent from a server;
installing, on a terminal associated with the power-saving app database, a new app for which a power-saving setting is to be configured; or
uninstalling, from the terminal associated with the power-saving app database, an installed app that is in the power-saving app database.

22. The device of claim 15, wherein the at least one processor is further configured to determine that the first app does not have an alarm function, wherein the alarm function is a function which at a preset time issues an alert signal, and wherein the first app is added to the wake-up alarm group in the event that that the first app is determined to not have the alarm function.

23. The device of claim 15, wherein the at least one processor is further configured to configure a power-saving level associated with the first app according to an indication of an extent to which real-time information regarding the first app is expected, wherein the first app is added to the wake-up alarm group according to the power-saving level associated with the first app.

24. The device of claim 15, wherein the at least one processor is further configured to:
in the event that a terminal on which the first app is installed is determined to be in a standby mode, monitor the adjusted alarm wake-up times corresponding to the plurality of apps;
detect that the adjusted alarm wake-up times corresponding to the plurality of apps are consistent; and
in response to the detection that the adjusted alarm wake-up times corresponding to the plurality of apps are consistent, wake up all the apps in the wake-up alarm group.

25. The device of claim 15, wherein the at least one processor is further configured to:
determine whether a terminal on which the first app is installed is in a standby mode;
in the event that the terminal is not in a standby mode, wake up the first app according to an initial alarm wake-up time; and
in the event that the terminal is in the standby mode, wake up the first app according to the adjusted alarm wake-up times.

26. A computer program product, the computer program product being embodied in a non-transitory computer readable storage medium and comprising computer instructions for:
adding a first application (app) to a wake-up alarm group comprising a plurality of apps, wherein the wake-up alarm group is selected among a plurality of wake-up alarm groups based at least in part on a power-saving level associated with the first app and a wake-up time information associated with the first app, the wake-up time information comprises a wake-up time window corresponding to the first app, and each of the plurality of wake-up alarm groups is associated with a corresponding alarm wake-up time;
adjusting a plurality of alarm wake-up times corresponding to the plurality of apps in the selected wake-up alarm group, wherein the plurality of alarm wake-up times corresponding to the plurality of apps are adjusted to be consistent; and
waking up the plurality of apps belonging to the wake-up alarm group according to the adjusted alarm wake-up times corresponding to the plurality of apps belonging to the wake-up alarm group.

27. A method, comprising:
adding a first application (app) to a wake-up alarm group comprising a plurality of apps, wherein the wake-up alarm group is selected among a plurality of wake-up alarm groups based at least in part on the power-saving level associated with the first app, and wherein the adding of the first app to the wake-up alarm group comprises:
setting a power-saving level associated with the first app;
determining an alarm wake-up time window corresponding to the first app according to the power-saving level associated with the first app, a most recent wake-up time of the first app, and a length of the wake-up time window; and
adding the first app to the wake-up alarm group for which a wake-up time window of the group and the alarm wake-up time window corresponding to the app intersect, wherein the length of the wake-up time window corresponds to a maximum length of time that wake-up can be delayed, and the alarm wake-up time window corresponding to the first app corresponds to a time interval during which the app is to be woken up;

adjusting a plurality of alarm wake-up times corresponding to the plurality of apps, wherein the plurality of alarm wake-up times corresponding to the plurality of apps are adjusted to be consistent; and waking up the plurality of apps belonging to the wake-up alarm group according to the adjusted alarm wake-up times corresponding to the plurality of apps belonging to the wake-up alarm group.

28. A method, comprising:

adding a first application (app) to a wake-up alarm group comprising a plurality of apps, wherein the wake-up alarm group is selected among a plurality of wake-up alarm groups based at least in part on the power-saving level associated with the first app, and wherein the adding of the first app to the wake-up alarm group comprises:

setting a power-saving level associated with the first app; and fetching a most recently updated power-saving level associated with the first app from a power-saving app database, wherein the first app is added to the wake-up alarm group based at least in part on the fetched power-saving level;

adjusting a plurality of alarm wake-up times corresponding to the plurality of apps, wherein the plurality of alarm wake-up times corresponding to the plurality of apps are adjusted to be consistent;

waking up the plurality of apps belonging to the wake-up alarm group according to the adjusted alarm wake-up times corresponding to the plurality of apps belonging to the wake-up alarm group; and updating the power-saving app database in response to:
receiving a modification to an app power-saving level;
receiving an updated power-saving configuration file sent from a server;
installing, on a terminal associated with the power-saving app database, a new app for which a power-saving setting is to be configured; or
uninstalling, from the terminal associated with the power-saving app database, an installed app that is in the power-saving app database.

29. A device, comprising:

at least one processor configured to:

add a first application (app) to a wake-up alarm group comprising a plurality of apps, wherein the wake-up alarm group is selected among a plurality of wake-up alarm groups based at least in part on the power-saving level associated with the first app, and wherein the adding of the first app to the wake-up alarm group comprises to:

set a power-saving level associated with the first app;

determine an alarm wake-up time window corresponding to the first app according to the power-saving level associated with the first app, a most recent wake-up time of the first app, and a length of the wake-up time window; and add the first app to the wake-up alarm group for which a wake-up time window of the group and the alarm wake-up time window corresponding to the app intersect, wherein the length of the wake-up time window corresponds to a maximum length of time that wake-up can be delayed, and the alarm wake-up time window corresponding to the first app corresponds to a time interval during which the first app is to be woken up;

adjust a plurality of alarm wake-up times corresponding to the plurality of apps, wherein the plurality of alarm wake-up times corresponding to the plurality of apps are adjusted to be consistent; and wake up the plurality of apps belonging to the wake-up alarm group according to the adjusted alarm wake-up times corresponding to the plurality of apps belonging to the wake-up alarm group; and a memory coupled to the at least one processor and configured to provide the at least one processor with instructions.

30. A device, comprising:

at least one processor configured to:

add a first application (app) to a wake-up alarm group comprising a plurality of apps, wherein the wake-up alarm group is selected among a plurality of wake-up alarm groups based at least in part on the power-saving level associated with the first app, and wherein the adding of the first app to the wake-up alarm group comprises to:

set a power-saving level associated with the first app; and fetch a most recently updated power-saving level associated with the first app from a power-saving app database, wherein the first app is added to the wake-up alarm group based at least in part on the fetched power-saving level;

adjust a plurality of alarm wake-up times corresponding to the plurality of apps, wherein the plurality of alarm wake-up times corresponding to the plurality of apps are adjusted to be consistent; and wake up the plurality of apps belonging to the wake-up alarm group according to the adjusted alarm wake-up times corresponding to the plurality of apps belonging to the wake-up alarm group; and a memory coupled to the at least one processor and configured to provide the at least one processor with instructions.

* * * * *